United States Patent [19]
Kudoh

[11] Patent Number: 6,133,848
[45] Date of Patent: *Oct. 17, 2000

[54] RADIO PAGER DISPLAYING TRANSMISSION NOTIFICATION MESSAGE

[75] Inventor: Kazuhiro Kudoh, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/751,333

[22] Filed: Nov. 18, 1996

Related U.S. Application Data

[63] Continuation of application No. 08/082,049, Jun. 24, 1993, abandoned.

[30] Foreign Application Priority Data

Jun. 30, 1992 [JP] Japan .................................. 4-196468

[51] Int. Cl.[7] .................................................. H04Q 1/00
[52] U.S. Cl. ..................................... 340/825.44; 361/67.1
[58] Field of Search ..................... 340/825.44, 825.48; 379/57, 199, 201, 100.06; 455/38.1, 67.1, 67.2; 371/67.1

[56] References Cited

U.S. PATENT DOCUMENTS

| | | | |
|---|---|---|---|
| 3,976,995 | 8/1976 | Sebestyn | 340/825.48 |
| 4,172,969 | 10/1979 | Levine | 340/825.44 |
| 4,266,098 | 5/1981 | Novak | 379/199 |
| 4,644,351 | 2/1987 | Zabarsky | 340/825.44 |
| 4,882,765 | 11/1989 | Maxwell | 455/38.1 |
| 4,926,460 | 5/1990 | Gutman | 340/825.48 |
| 4,953,203 | 8/1990 | Shepard | 379/201 |
| 5,043,721 | 8/1991 | May | 340/825.44 |
| 5,127,047 | 6/1992 | Bell | 379/100.06 |
| 5,487,100 | 1/1996 | Kane | 340/825.44 |

*Primary Examiner*—Brian Zimmerman
*Attorney, Agent, or Firm*—Ostrolenk, Faber, Gerb & Soffen, LLP

[57] ABSTRACT

In a radio display pager, a message and a call number of a message destination are transmitted from a speaker in the form of an audible frequency data signal to a paging network. Receiving a transmission radio wave emitted from the network, the pager extracts therefrom a call number and a message to compare these items with the ID call number of the pager, or with the call number of the message destination stored in its memory. When a match results, the call number of the message destination and the message are displayed on an LCD. This guarantees confirmation of the contents of the call number and the message sent from the pager and transmission thereof from the paging network.

8 Claims, 3 Drawing Sheets

FIG. 3

DESTINATION: 03-1111-1111  CONFIRM

AT 7 O'CLOCK IN ○○

6,133,848

RADIO PAGER DISPLAYING TRANSMISSION NOTIFICATION MESSAGE

This is a Continuation of application Ser. No. 08/082,049 filed on Jun. 24, 1993, now abandoned.

BACKGROUND OF THE INVENTION

The present invention relates to a radio display pager having functions of an electronic pocketbook or the like for sending a pager message and a call number denoting a transmission destination of the message, and then receiving a radio wave emitted from the paging network when sending the message and the call number over the paging network, thereby echoing back the number and the message to the user's pager for display and confirmation on a display thereof.

DESCRIPTION OF THE RELATED ART

In a radio display pager of the prior art, there can be displayed a received message together with a call signal thereof. In a case where a function of an electronic pocketbook is disposed in a radio display pager, whose operations and processing are carried out by a keyboard input section, a controller of a receiver, a memory, and a display, there can be achieved such operations as registration, retrieval, and display of information related to keywords, for example, personal names and company names. In addition, when a user carrying about the pager inputs a call (paging) number of a calling partner and a message, an audible frequency data signal is produced in response thereto, which can be supplied as a voice (tone) signal to a telephone set so as to be transmitted therefrom via a paging network.

In the conventional display pager, to the extent the contents of the message become more complicated, the user issuing the message will worry much more about or desire to know whether or not the message is appropriately transmitted to the destination. However, the user cannot confirm reception of the message on the receiver side immediately after the transmission thereof. This disadvantage is resultant from the fact that the pager system provides only one-directional communication. Furthermore, as for the telephone number of the destination thus emitted from the paging network, it cannot be confirmed whether or not the number is actually the telephone number sent from the pager.

SUMMARY OF THE INVENTION

It is therefore an object of the present invention to provide a radio display pager for receiving, after sending a call number of a transmission destination and a message, a radio wave emitted from a paging network when transmitting the call number and the message, and then displaying the number and the message, and guaranteeing confirmation of the transmission of the number and the message from the network and the contents of the number and the message thereof, thereby solving the problem above.

In accordance with the present invention, there is provided a radio display pager including input means for inputting therefrom a message and a call number of destination of the message, storage means for storing therein a call number of the pager as well as the message and the call number of message supplied from the input means, audible frequency data signal generating and transmitting means for generating and outputting an audible frequency data signal associated with the message and the call number of message supplied from the input means, receiving means for receiving a transmission radio wave emitted from a paging network and outputting therefrom a data signal of a call number and a message, comparator means for comparing the received data signal with the own call number of the pager or the call number of message destination which are stored in the storage means, read means operative when the data signal is determined to match the call number of message destination by the comparator means for reading from the storage means the call number of message destination and the message, and display means for displaying the call number and the message in the input data from the input means and in the data signal from the receiving means.

In a radio display pager in accordance with the present invention, a message and a call number of transmission destination of the message are sent to a paging network, and then the pager receives a radio wave emitted from the network to obtain a call number and a message, and then compares the call number with a call number of the pager or the call number of message destination which are stored in storage means thereof. When a matching condition results from the comparison, the call number of message destination and the message related thereto are displayed to guarantee confirmation of the transmission of the call number and message, which are sent from the pager, from the network and the contents of the number and the message.

BRIEF DESCRIPTION OF THE DRAWINGS

The objects and features of the present invention will become more apparent from the consideration of the following detailed description taken in conjunction with the accompanying drawings wherein:

FIG. 3 is a diagram schematically showing an example of the contents of display message in the system of FIG. 1.

DESCRIPTION OF THE PREFERRED EMBODIMENT

Referring now to the accompanying drawings, a description will be given of an embodiment of a radio display pager in accordance with the present invention.

Figure 1:
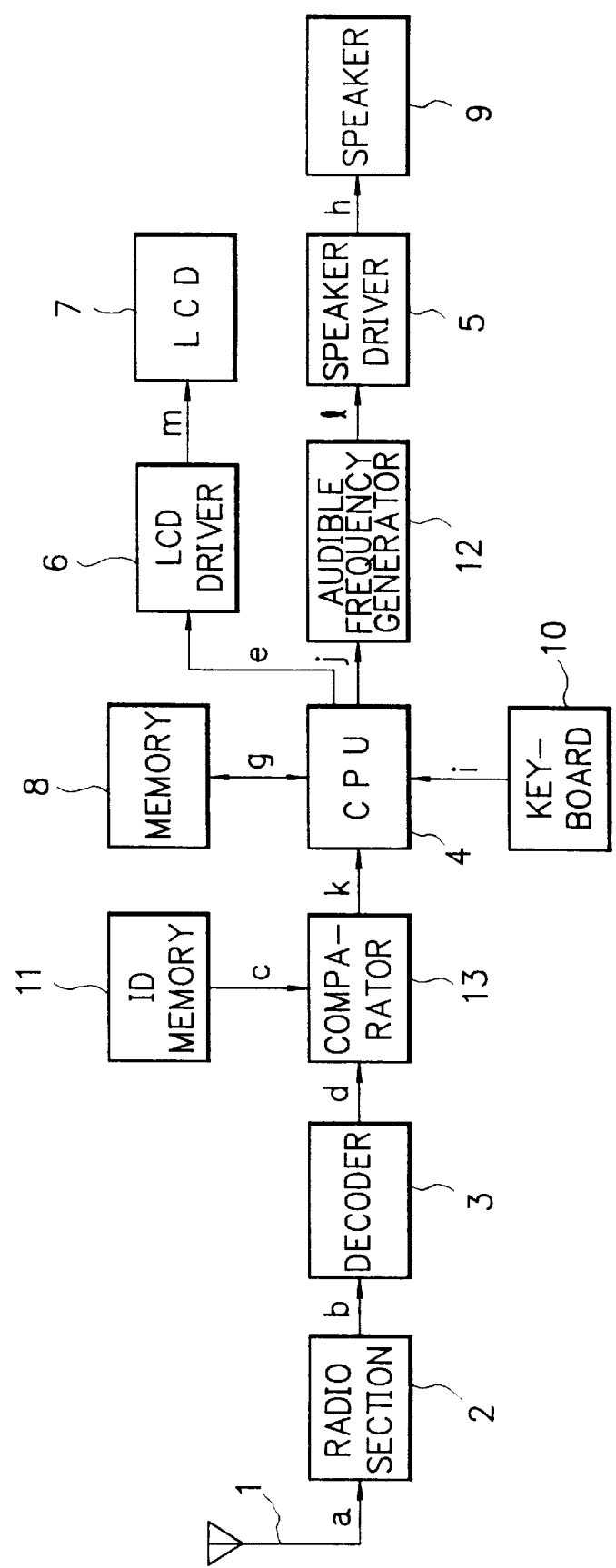
FIG. 1 is a schematic block diagram showing a radio display pager in an embodiment in accordance with the present invention.

FIG. 1 shows the construction of the embodiment of the pager. In this diagram, a message and a call number of a transmission destination of the message are inputted from a keyboard 10 disposed for serving as input means. The keyboard 10 is connected to a central processing unit (CPU) 4, which is in turn linked with a memory 8. In the memory 8, there are stored the message and the call number delivered from the keyboard 10. The CPU 4 sends an output signal to an audible frequency generator 12 which serves as means to produce a tone signal for confirmation. The signal is fed therefrom to a speaker driver 5 and a speaker 9. The speaker 9 is responsive to the call number and the message supplied from the keyboard 10 to sound the number and the message in the form of a voice. The voice is then transmitted via a nearby telephone set to the destination of transmission.

The configuration further includes an antenna 1, a radio section 2, and a decoder 3, which comprise receiving means of the pager. The antenna 1 receives a radio signal a intended for the destination paper which has been transmitted to a pager network. The antenna 1 is connected to the radio section 2. In the radio section 2, the received radio signal a is amplified and then demodulated to be a signal b through a waveform shaping operation. The signal b is delivered to the decoder 3 such that the call number and the message contained in the signal b are decoded into a signal d.

The signal d is inputted to a comparator 13. The comparator 13 compares a call number of the pager stored in an identifier (ID) memory 11 and the call number of the message destination stored in the memory 8 with the call number of the message destination contained in the radio signal a or collates the message stored in the memory 8 with the message in the radio signal a, as discussed further below, thereby issuing a processing request to the CPU 4 when a matching condition is detected as a result of the comparison.

In response to the request, the CPU 4 delivers a data signal e containing the call number of the message destination and the message to a liquid crystal display (LCD) driver 6. Moreover, to cause the speaker 9 to sound a confirmation voice, the CPU 4 outputs a data signal j to the audible frequency generator 12.

The LCD driver 6 supplies an outut signal to an LCD 7. In response to the signal e from the CPU 4, the LCD 7 displays thereon the call number and the message together with a symbol denoting confirmation. Furthermore, the generator 12 produces, on receiving the signal j from the CPU 4, a voice output l.

The output l is transformed by the speaker driver 5 into a signal h, which then drives the speaker 9 to sound a confirmation voice.

Next, a detailed description will be given of the constitution of the embodiment in accordance with the present invention. In the system of FIG. 1, the radio signal a received by the antenna 1 is amplified and demodulated by the radio section 2 and is then subjected to a waveform shaping operation. The resultant digital signal b is delivered to the decoder 3. Thereafter, the ID call (paging) number c stored in the memory 11 and the digital signal d produced from the decoder 3 are supplied to the comparator 13. In the comparator 13, when it is recognized, as a result of the collation of the call number c of the pager with the signal d, that the received call number is equal to the call number c, the received call signal k is delivered to the CPU 4.

In this case, the comparator 13 issues a processing request to the CPU 4, when necessary, such that the CPU 4 carries out a control operation to read the call signal k from the comparator 13. On receiving the signal therefrom, the CPU 4 supplies the audible frequency generator 12 with a control signal for notification. In addition, the CPU 4 outputs a control signal to the LCD driver 6 to display the message e on the LCD 7. Moreover, the received message is stored in the memory 8 under control of the CPU 4 so as to be displayed again in response to an appropriate request operation.

In this connection, the control signal j is fed from the CPU 4 via the frequency generator 12 to the speaker driver 5 to report the call.

Furthermore, there are supported such functions of an electronic pocketbook as follows. According to the CPU 4 and the memory 8 as means for storing therein and reading therefrom a destination call number and a message, when information i related to a keyword of a personal name or a company name is inputted from the keyboard 10, pertinent information is written in the memory 8 as a result of processing of the CPU 4. In addition, the information i from the keyboard 10 is used to retrieve associated information; moreover, the message is displayed on the LCD 7 under control of the LCD driver 6.

In addition, when information i including a message and a call number of a destination thereof is inputted from the keyboard 10, the CPU 4 controls the audible frequency generator 12 to produce an audible frequency data signal related to the call number and the message. In response thereto, the speaker driver 5 activates under control of the CPU 4 the speaker 9 to send the message via a telephone set in the neighborhood thereof.

When the message is thus transmitted, a call transmission is achieved by the telephone set to the paging network. In this case, the CPU 4 delivers the destination call signal k to the comparator 13. Resultantly, in the comparator 13, the destination call signal k is collated with the digital signal d obtained by processing, by the radio section 2 and the decoder 3, the radio wave of the call transmitted via the network.

In a case where a match results from the collation, the message stored in the memory 8 is read therefrom to be displayed together with the call number of the destination of transmission.

In the display operation, it is checked by the comparator 13 to determine whether or not the message of the destination call signal obtained when the collation results in a match is identical to the message transmitted from the pager and stored in the memory 8. When the messages match each other, a reporting operation or notification is accomplished; moreover, the message is displayed and is written in the memory 8. When the transmitted message is displayed, the call number of the destination is also presented.

Now, the operation of the embodiment above will be described.

Figure 2:
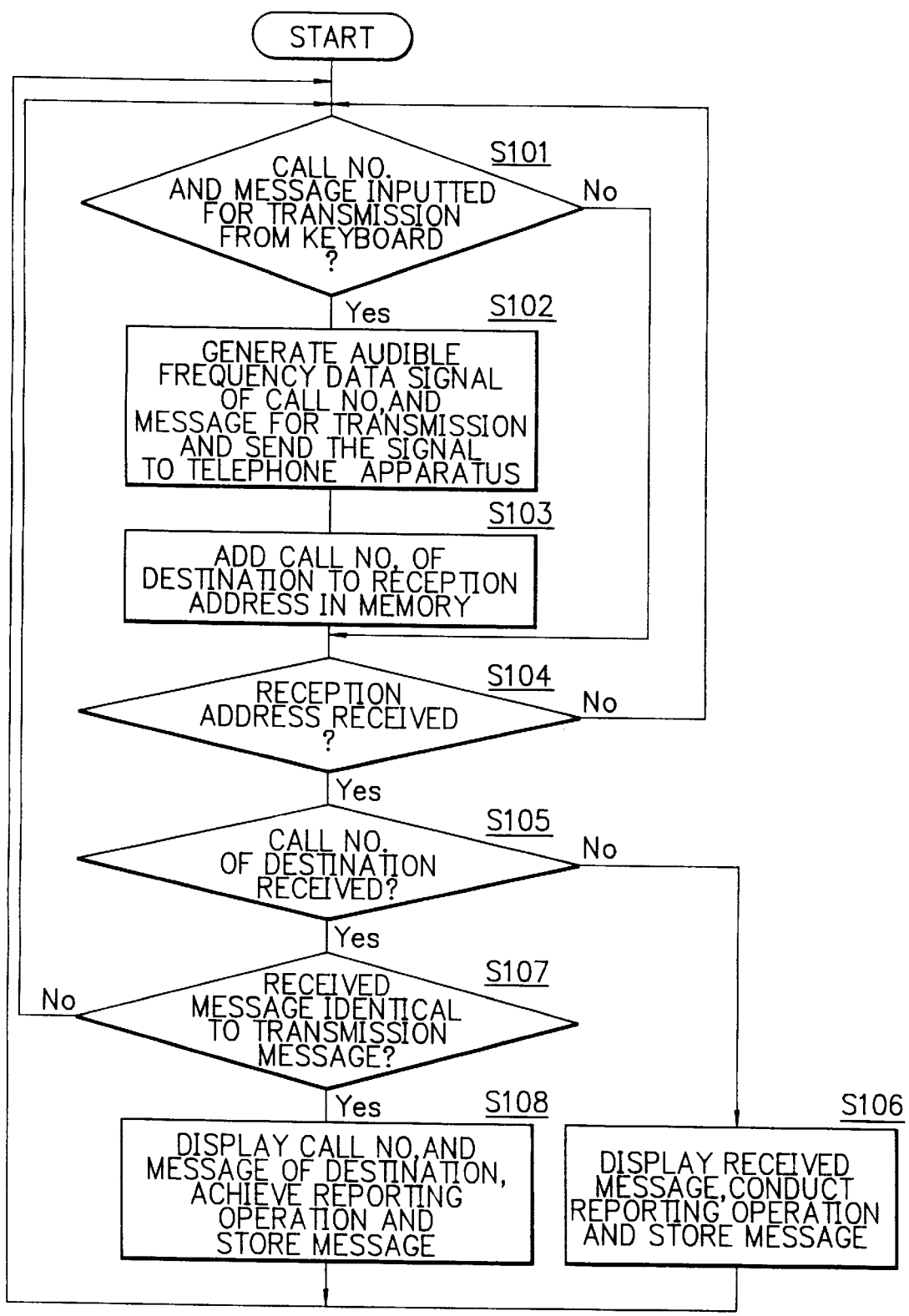
FIG. 2 is a flowchart showing the operation of the apparatus of FIG. 1.

FIG. 2 shows the processing procedure of operation in the system. According to this flowchart, a message and a call number of a destination thereof are supplied from the keyboard 10 to the CPU 4 (step 101).

When information i is inputted as above, an audible frequency data signal associated with the call number and the message is created from the frequency generator 12 to be sent through the speaker driver 5 and the speaker 9. In response thereto, a call and selection signal is sent from a nearby telephone set to transmit the call signal and the message to the paging network (step 102).

In the operation, under control of the CPU 4, an address of the call number of message destination is added to the reception address in the memory 8 in addition to the ID call number of the pager (step 103).

Thereafter, a call transmission is accomplished from the paging network. A radio wave accordingly emitted therefrom is received and analyzed by the antenna 1, the radio section 2, and the decoder 3 so as to obtain a reception address (step 104). The CPU 4 invokes the comparator 13 to determine whether or not the reception address indicates an ordinary ID call number of the pager (step 105). When the address indicates a reception of the pager's own call number, in other words there is not a reception of a call number of a destination, the received message is presented via the LCD driver 6 on the LCD 7 and is then stored in the memory 8. Furthermore, the pertinent state is reported via the audible frequency generator 12 and the speaker driver 5, thereby notifying the user of the condition from the speaker 9 (step 106). In other words, this is the operation of receiving an ordinary call to the pager.

In the step 105, when the reception address indicates the call number of a destination that was emitted via the telephone to the paging network, the message acquired through the radio section 2, the decoder 3, and the comparator 13 is collated by the comparator 13 with the message to the destination which is beforehand stored in the memory 8 in the step 103 and which is read therefrom by the CPU 4, thereby confirming a match or mismatch therebetween (step 107).

When the messages are identical to each other, the call number of the destination and the message are displayed via the LCD driver 6 on the LCD 7; furthermore, a report signal of the condition is sent through the frequency generator 12 and the speaker driver 5 to the speaker 9, thereby notifying the user of the coincidence between the messages (step 108).

In the step 107, when the received message is other than that transmitted in the step 101, the system skips the message presentation on the LCD 7, the storage of the message in the memory 8, and the notification of the condition from the speaker 9.

FIG. 3 shows an example of the display contents on the LCD in a case where the message collation results in a match. In this diagram, when the call number of message destination sent via the telephone set to the paging network is "03-1111-1111" and the transmitted message is "At 7 o'clock in ○○ station", these items are displayed on the LCD 7.

In this situation, a word "Confirm" is simultaneously displayed under control of the CPU 4. This helps the user recognize that it is confirmed that the display contents are the call number of message destination sent via the telephone set to the paging network and the message.

As described above, after sending a call number of a destination and a message, the pager receives a radio wave emitted from the paging network to transmit the call number and the message to the destination and then displays the call number and the contents of message on the LCD 7. In consequence, it is guaranteed that the user can confirm the contents of the number and the message sent from the telephone set and the transmission thereof from the paging network.

In the radio display pager in accordance with the present invention, after a call number of message destination and a message are sent to a paging network. a transmission radio wave emitted from the paging network is received to determine a call number and a message therefrom and the paper compares the received call number with the ID call number of the pager or the call number of the message destination. When a match results, the call number and the message are displayed. This consequently guarantees the ability of the user to confirm the contents and transmission from the paging network of the destination call number and the message which are sent from the pager.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A radio paging device having a function of confirming the correctness of a transmitted page, the radio paging device having a device reception address enabling the radio paging device to selectively receive messages from a paging network, comprising:

first means responsive to a completion of a transmission of a transmitted page signal from said radio paging device to said paging network and subsequent receipt of a received page signal from said paging network, the transmitted page signal comprising a given destination address and a given message, said first means being for making a first decision, based on a received destination address extracted from said received page signal from the paging network, concerning whether said received page signal has a destination address which is the same as said device reception address of said radio paging device or the same as said given destination address of said transmitted page signal;

second means responsive to a negative result of said first decision for returning to an operation of accepting a page input;

third means responsive to an affirmative result of said first decision for making a second decision on whether said received page signal has a destination address which coincides with said given destination address and for making a third decision on whether a received message extracted from said received page signal coincides with said given message;

fourth means responsive to a negative result of said second decision for executing an ordinary operation for receiving a page addressed to the radio paging device; and fifth means responsive to affirmative results of both of said second and third decisions for informing the user of the radio pager device of the correctness of said transmitted page signal.

2. A radio paging device as defined in claim 1, wherein said first means for making a first decision comprises:

a memory area for storing a station address such that the radio paging device is permitted to receive a page having said station address as said destination address;

means operative prior to said transmission of said page for storing said destination address of said page in said memory area; and means responsive to said completion of said transmission for making a test to see if said received destination address is found in said memory area.

3. A radio paging device as defined in claim 1, wherein said fifth means for informing said user of said correctness of said transmitted page comprises:

means for displaying said given destination address, said given message, and an indication of said correctness of said transmitted page.

4. A radio paging device as defined in claim 3, wherein said fifth means for informing said user of said correctness of said transmitted page further comprises:

means for providing a sound alert.

5. In a radio display pager having a pager reception address enabling the radio paging device to selectively receive messages from a paging network, a method for confirming the correctness of a transmitted page, comprising the steps of:

in response to a completion of a transmission of a transmitted page signal from said radio paging device to said paging network, the transmitted page signal comprising a given destination address and a given message, making a first decision, based on said received destination address extracted from a received page signal from the paging network, concerning whether said received page signal has a destination address which is the same as said pager reception address of said radio paging device or the same as said given destination address of said transmitted page signal;

in response to a negative result of said first decision, returning to an operation of accepting a page input;

in response to an affirmative result of said first decision, making a second decision on whether said received page signal has a destination address which coincides with said given destination address and making a third decision on whether a received message extracted from said received page signal coincides with said given message;

in response to a negative result of said second decision, executing an ordinary operation for receiving a page addressed to the radio display pager; and in response to affirmative results of both of said second and third decision, informing the user of the radio paging device of the correctness of said transmitted page signal.

6. A method as defined in claim 5, wherein the radio display pager is provided with a memory including an area for storing a station address such that the radio display pager is permitted to receive a page having said station address as said destination address, and wherein said step of making a first decision comprises the steps of:

storing said destination address of said page in said memory area prior to said transmission of said page; and in response to said completion of said transmission, making a test to see if said received destination address is found in said memory area.

7. A method as defined in claim 5, wherein the step of informing said user of said correctness of said transmitted page comprises the step of:

displaying said given destination address, said given message, and an effect to said correctness of said transmitted page.

8. A radio paging device as defined in claim 7, wherein said step of informing said user of said correctness of said transmitted page further comprises the step of:

providing a sound alert.

* * * * *